L. E. DUNLAP & J BISSONETT.

MILK CAN COVER.

No. 181,777. Patented Sept. 5, 1876.

Witnesses:
Charles E Allen
Harry O. Wheeler

Inventor:
L. E. Dunlap
Joseph Bissonett

UNITED STATES PATENT OFFICE.

LOREN E. DUNLAP, OF WILLISTON, AND JOSEPH BISSONETT, OF JERICHO, VERMONT.

IMPROVEMENT IN MILK-CAN COVERS.

Specification forming part of Letters Patent No. 181,777, dated September 5, 1876; application filed March 14, 1876.

*To all whom it may concern:*

Be it known that we, LOREN E. DUNLAP, of Williston, in the county of Chittenden and State of Vermont, and JOSEPH BISSONETT, of Jericho, in said county and State, have invented a new and useful Improvement in the Covers of Milk-Cans, used for the transportation of milk, of which the following is a specification:

The object of this invention is to produce a ventilating milk-can cover, which shall afford, by the arrangement and combination of its several parts, sufficient opportunity at all times for the escape of any impure air, animal heat, or offensive odors which may exist, especially in fresh milk while confined for the purposes of transportation; also for supplying to the interior of the can a current of pure air, without exposing the milk to injury from dust, rain, or other foreign substances.

The invention is simple, easily cleaned, and readily adapted to milk-cans of any dimensions. The several parts are made of the same metal as the milk-can, tin being preferred.

Figure 1:
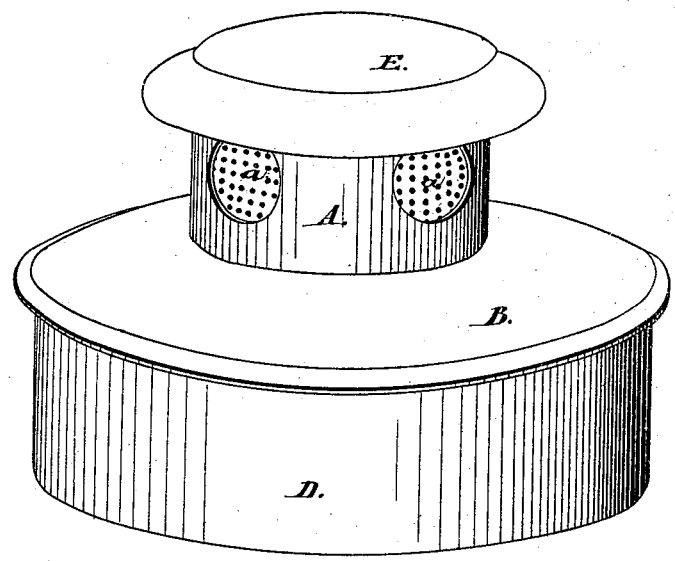
Figure 2:
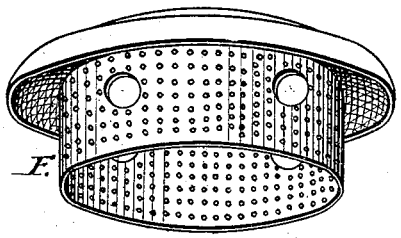
Figure 3:
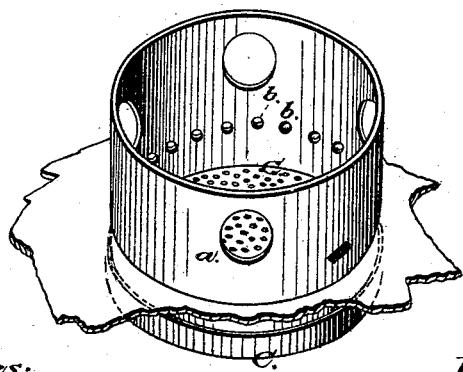

In the drawings, Figure 1 is a perspective view of the improved milk-can cover, with the ventilator attachment. Figs. 2 and 3 are perspective views of the adjustable top and bottom of the ventilating-cylinder.

The same letters refer to similar parts in the drawings.

The ventilating-cylinder A A passes through the center of the can-cover B, of which it practically forms a part. Its length and diameter are proportioned to the dimensions and requirements of the can. Through its projecting sides, above and below the surface of the can-cover B, are vent-holes $a\,a$ and $b\,b$ for the passage of air, the former being larger and less numerous than the latter. In the exterior projection of the cylinder the vent-holes $a\,a$ are cut in a line nearly equidistant from and between the upper surface of the can-cover B and the top of the cylinder. In the interior projection the upper sides of the vent-holes $b\,b$ coincide with the under side of the can-cover B.

An adjustable cap, C, of perforated tin or wire-gauze, protects the milk from splashing through the cylinder during agitation at the same time the perforations allow any milk which may splash through the vent-holes $b\,b$ to run back into the milk-can. The top of the can-cover B is arched in the center, to form an air-chamber above the milk when the cover is on the can.

The rim of the can-cover B projects beyond the sides of the can to prevent it from sinking into the can as far as the surface of the milk, as milk-can covers are ordinarily made, while the edge of the rim curves downward over the sides of the can sufficiently far to secure an air-tight joint between the top of the sides of the milk-can and the cover.

The hoop D, which is attached to the under side of the cover B, is made to fit closely to the interior of the sides of the can for the purpose of holding the cover B firmly in place. The upper end of the ventilating-cylinder A A is protected by an adjustable top, E. This top is also arched in the center, and its rim projects beyond the sides of the cylinder A in the same manner as the rim of the cover B, to prevent, as far as may be, the entrance of dust or rain into the cylinder A through the vent-holes $a\,a\,a$.

The hoop F F of the top E is made of perforated tin or wire-gauze. It is sufficiently large in diameter to fit closely into the top of the cylinder A, and is of the same width as the height of the exterior projection of the cylinder A. Vent-holes are cut in this hoop to correspond with the vent-holes $a\,a\,a$. When the top E is placed on the cylinder A, and the vent-holes in its hoop and in the cylinder open into each other, the greatest ventilation is secured to the interior of the milk-can. By turning the top E in either direction, the vent-holes $a\,a$ in the cylinder A are more or less covered by the perforated tin or wire-gauze of which the hoop F F is composed, and the ventilation through the holes is correspondingly checked.

Suitable handles for raising the cover B from the can are attached to its top and on either side of the cylinder A. The improved milk-can cover B, with its ventilating-cylinder A constructed as above described, is practical in its operation, and so simple in its design and the arrangement of its several parts that there is no portion of it but what can be reached by the hand, and therefore kept easily and thoroughly cleaned.

What we claim, and desire to secure by Letters Patent, is—

The construction of an improved milk-can cover, having an adjustable ventilating-top, E, and a projecting slightly-curved rim, substantially as described, and for the purpose set forth.

L. E. DUNLAP.
JOSEPH BISSONETT.

Witnesses:
CHARLES E. ALLEN,
HENRY O. WHEELER.